United States Patent
Conway et al.

(10) Patent No.: US 10,084,830 B2
(45) Date of Patent: *Sep. 25, 2018

(54) SENDING SNIPPETS OF MEDIA CONTENT TO A COMPUTING DEVICE

(71) Applicant: Google LLC, Mountain View, CA (US)

(72) Inventors: David P. Conway, Los Altos, CA (US); Michael A. Cleron, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/819,470

(22) Filed: Nov. 21, 2017

(65) Prior Publication Data

US 2018/0159907 A1    Jun. 7, 2018

Related U.S. Application Data

(63) Continuation of application No. 14/807,402, filed on Jul. 23, 2015, now Pat. No. 9,832,239, which is a
(Continued)

(51) Int. Cl.
*H04L 29/06*    (2006.01)
*G06Q 20/12*    (2012.01)
(Continued)

(52) U.S. Cl.
CPC ....... *H04L 65/403* (2013.01); *G06Q 20/1235* (2013.01); *G06Q 50/01* (2013.01);
(Continued)

(58) Field of Classification Search
CPC .. H04L 65/403; G06Q 50/01; G06Q 20/1235; H04N 21/47214; H04N 21/4722;
(Continued)

(56) References Cited

U.S. PATENT DOCUMENTS 6,463,466 B1    10/2002    Weyer
2002/0069218 A1*    6/2002    Sull .................... G06F 17/30796
715/202

(Continued)

FOREIGN PATENT DOCUMENTS

JP    2002-149693    5/2002
JP    2005-242399    9/2005
KR    20090014460    2/2009

OTHER PUBLICATIONS

Emigh, J., "Shortcovers 'Kindle killer' e-reader under way for smartphones", Tech Gear News / Betanews. [online]. Retrieved from the Internet at <URL:http://betanews.com/2009/02/11/shortcovers-kindle-killer-e-reader-under-way-for-smartphones/>, (Feb. 11, 2009).
(Continued)

*Primary Examiner* — Philip Chea
*Assistant Examiner* — Wuji Chen
(74) *Attorney, Agent, or Firm* — Fish & Richardson P.C.

(57) ABSTRACT

Techniques include: providing media content to a computing device; waiting a period of time; determining that the media content has not been used; sending a snippet to the computing device, where the snippet corresponds to a portion of the media content that is executable on the computing device; and repeating waiting, determining and sending until the media content has been used or a limiting factor has been met.

19 Claims, 7 Drawing Sheets

Related U.S. Application Data continuation of application No. 13/723,819, filed on Dec. 21, 2012, now abandoned.

(60) Provisional application No. 61/579,253, filed on Dec. 22, 2011.

(51) Int. Cl.
    *G06Q 50/00* (2012.01)
    *H04N 21/472* (2011.01)
    *H04N 21/4722* (2011.01)
    *H04N 21/845* (2011.01)
    *H04N 21/8549* (2011.01)
    *H04N 21/858* (2011.01)
    *H04N 21/81* (2011.01)

(52) U.S. Cl.
    CPC ... *H04N 21/4722* (2013.01); *H04N 21/47214* (2013.01); *H04N 21/8456* (2013.01); *H04N 21/858* (2013.01); *H04N 21/8549* (2013.01); *H04N 21/812* (2013.01)

(58) Field of Classification Search
    CPC ............ H04N 21/858; H04N 21/8456; H04N 21/8549; H04N 21/812
    See application file for complete search history.

(56) References Cited

U.S. PATENT DOCUMENTS

| | | | | |
|---|---|---|---|---|
| 2002/0156691 | A1* | 10/2002 | Hughes | G06Q 30/02 705/51 |
| 2003/0131353 | A1* | 7/2003 | Blom | H04L 63/0428 725/25 |
| 2003/0225609 | A1 | 12/2003 | Klipfell, III | |
| 2004/0128324 | A1* | 7/2004 | Sheynman | G06F 21/10 |
| 2005/0091186 | A1 | 4/2005 | Elish | |
| 2005/0104880 | A1* | 5/2005 | Kawahara | G06F 3/04815 345/419 |
| 2006/0101499 | A1* | 5/2006 | Aravamudan | G06F 17/30392 725/86 |
| 2007/0050517 | A1* | 3/2007 | Doi | G11B 27/031 709/236 |
| 2007/0150963 | A1* | 6/2007 | Lee | G06F 21/10 726/27 |
| 2007/0157249 | A1* | 7/2007 | Cordray | G06F 3/0482 725/58 |
| 2008/0270532 | A1* | 10/2008 | Billmaier | H04L 67/32 709/203 |
| 2009/0049118 | A1* | 2/2009 | Stevens | G06F 17/30017 709/203 |
| 2009/0144392 | A1* | 6/2009 | Wang | G06Q 10/10 709/217 |
| 2009/0262238 | A1* | 10/2009 | Hope | G11B 27/034 348/441 |
| 2010/0241491 | A1* | 9/2010 | Eglen | G06Q 10/00 705/4 |
| 2011/0078714 | A1* | 3/2011 | Sagayaraj | G06Q 30/06 725/5 |
| 2011/0093337 | A1* | 4/2011 | Granit | G06Q 30/0251 705/14.53 |
| 2011/0219413 | A1* | 9/2011 | Krikorian | G11B 27/034 725/109 |
| 2012/0096357 | A1* | 4/2012 | Folgner | G11B 27/34 715/726 |
| 2012/0216296 | A1* | 8/2012 | Kidron | G06F 17/30867 726/28 |
| 2012/0254356 | A1* | 10/2012 | Kashiwagi | G06Q 30/0201 709/217 |

OTHER PUBLICATIONS

Fox, P. et al., "Integrating Lecture Recordings with Social Networks", from 2009 First International Conference on Advances in Multimedia, Retrieved from the Internet at URL:<http://www.inf.uos.de/papers_pdf/2009_03.pdf>, (Mar. 2009).

International Preliminary Report on Patentability in International Application No. PCT/US2012/071194, dated Jun. 24, 2014, 8 pages.

International Search Report and Written Opinion in Application No. PCT/US2012/071194, dated Apr. 19, 2013, 12 pages.

Ketterl, M. et al., "Bringing Web 2.0 to Web Lectures", [online] Retrieved from the Internet at URL:<http://www.informatik.uni-osnabrueck.de/papers_pdf/2009_02.pdf>, (Feb. 2009).

Raphael, J. R., "Kindle's New Challenger Brings E-Books to iPhones", PC World [online], Retrieved from the Internet on Mar. 23, 2011 at URL:<http://www.pcworld.com/article/159321/kindles_new_challenger_brings_ebooks_to_iphones.html>, (Feb. 10, 2009).

Tungare, M., "Book-as-Blog: Encouraging Reading by Posting a Chapter at a Time", [online] Retrieved from the Internet on Mar. 23, 2011 at URL:<http://manas.tungare.name/blog/book-as-blog-encouraging-reading-by-presenting-a-chapter-at-a-time/>, (Dec. 17, 2008).

Wikipedia article on "E-book", [online] Retrieved on Mar. 23, 2011 from the Internet at URL:<http://en.wikipedia.org/wiki/E-book>, (Mar. 22, 2011).

* cited by examiner

SENDING SNIPPETS OF MEDIA CONTENT TO A COMPUTING DEVICE

CROSS-REFERENCE TO RELATED APPLICATION

This application is a continuation of U.S. application Ser. No. 14/807,402, filed Jul. 23, 2015, which is a division of U.S. application Ser. No. 13/723,819, filed Dec. 21, 2012, which claims priority to U.S. Provisional Application No. 61/579,253, which was filed on Dec. 22, 2011. The contents of U.S. Provisional Application No. 61/579,253 are hereby incorporated by reference into this disclosure in their entirety.

TECHNICAL FIELD

This disclosure relates generally to sending snippets of media content to a computing device.

BACKGROUND

Media content may be purchased from any number of online media stores. The media content may include, but is not limited to, songs, movies, television shows, and video games. Typically, media content is downloaded and stored in memory on a computing device on which the media content is to be played. The media store may be made aware when the media content is used. For example, when a movie is played, a player on which the move is presented may notify the media store that the movie is being played.

SUMMARY

This disclosure describes systems and techniques for sending snippets of media content to a computing device.

The foregoing systems and techniques for sending snippets of media content to a computing device may include operations such as the following: providing media content to the computing device; waiting a period of time; determining that the media content has not been used; sending a snippet to the computing device, where the snippet corresponds to a portion of the media content that is executable on the computing device; and repeating waiting, determining and sending until the media content has been used or a limiting factor has been met. The systems and techniques may include one or more of the following features, either alone or in combination.

The operations may include enabling sharing the snippet via a social networking service. The operations may include creating a snippet from the media content; and sharing the created snippet via the social networking service.

The operations may include enabling sharing a snippet associated with the media content via one or more social networking services; and maintaining statistics on events associated with different sharers and different social networking services, where the statistics relate to which sharers and social networking services result in sales of full media content associated with corresponding snippets.

The operations may include sharing a snippet associated with the media content via one or more social networking services; and presenting, with the snippet, an opportunity to purchase full media content associated with the snippet. A different snippet may be sent each time the sending is repeated, where the different snippet corresponds to a different portion of the media content than was sent in a prior iteration of waiting, determining and sending.

Determining that the media content has not been used may include performing the following operations: storing a time at which the media content was sent to the computing device; and checking for receipt of data indicative of use of the media content. The snippet may be a first snippet and the media content may be first media content; and the operations may include sending, to the computing device, a second snippet, where the second snippet is different from the first snippet, and where the second snippet corresponds to a portion of the second media content that is executable on the computing device. The operations may include identifying the second media content based on the first media content. The second media content may have at least one (e.g., one or more) feature(s) in common with the first media content. The first media content and the second media content may be different types of media.

The operations may include ranking snippets of the media content; and at each iteration of waiting, determining and sending, a more highly ranked snippet may be sent. The snippets may be ranked according to one or more criteria designed to motivate use of the media content.

The snippet may include more than one portion of media content, where each portion of the media content includes a time-slice of the media content. The media content may be first media content, and the snippet may include a first portion that corresponds to the first media content and a second portion that corresponds to second media content, were the second media content is different from the first media content. The second media content may have at least one feature in common with the first media content. The second media content may be selected for association with the first media content based on a popularity of the second media content.

The foregoing systems and techniques for sending snippets of media content to a computing device may include operations such as the following: offering a snippet of media content for download, where the media content is offered for a price, where the price is dependent on one or more attributes of the media content, and where the one or more attributes include a number of shares available. The operations may also include receiving, from the computing device, a request to purchase the snippet of media content, where the request includes a number of shares; sending the snippet to the computing device in response to the request; and restricting play of the snippet to the number of shares purchased.

All or part of the systems and techniques described herein may be implemented as a computer program product that includes instructions that are stored on one or more non-transitory machine-readable storage media, and that are executable on one or more processing devices. All or part of the systems and techniques described herein may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Described herein is a system that includes providing media content to a computing device, such as a smartphone; waiting a period of time; determining that the media content has not been used (e.g., played, viewed, etc.) within the period of time; sending a snippet (e.g., a portion of the media content) to the computing device that originally downloaded the media content; and repeating the process until the media content has been used or a limiting factor has been met (e.g., a certain number of snippets have been sent).

Figure 1:
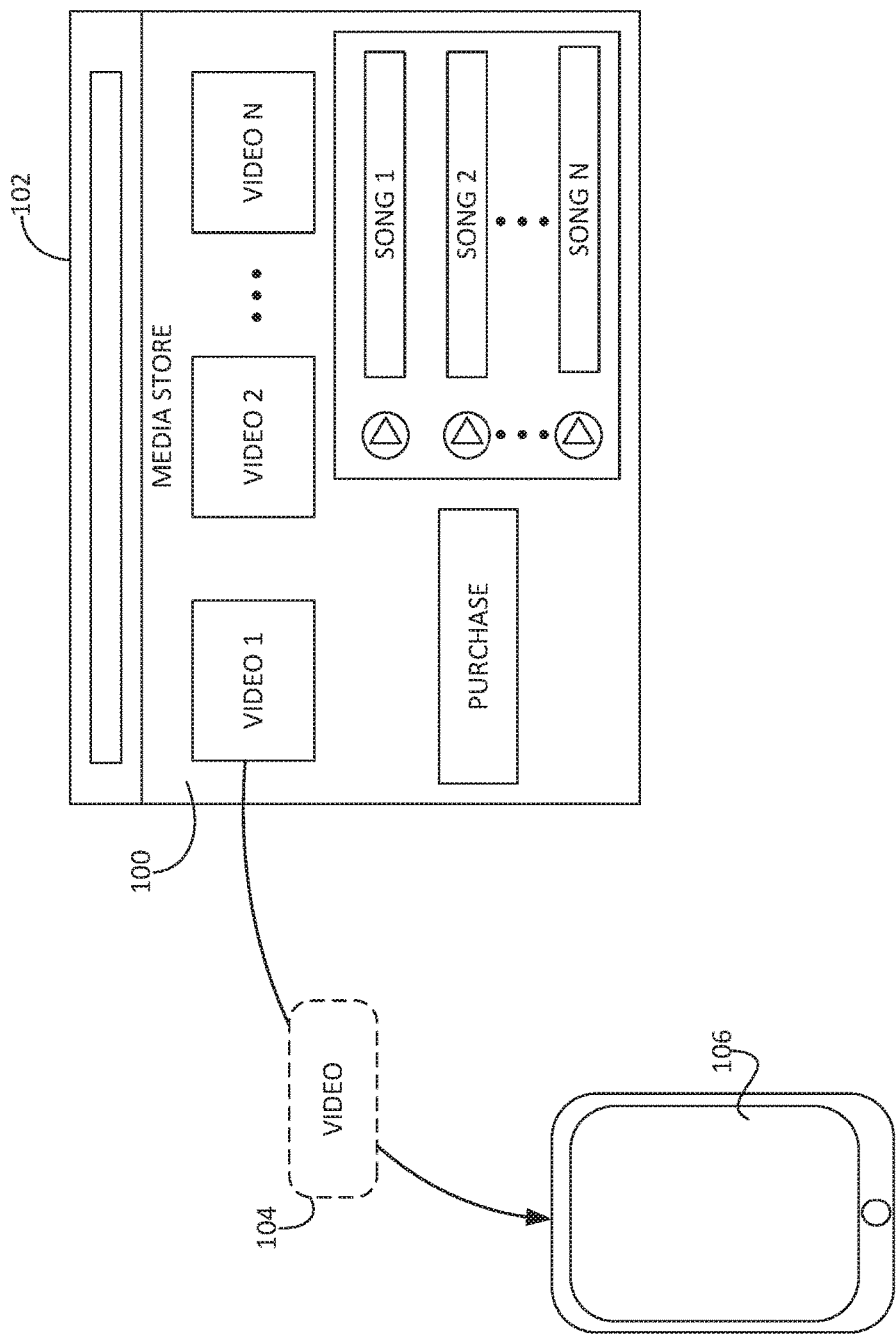
FIGS. 1 to 3 are block diagrams showing, conceptually, an example of a process for sending snippets of media content to a computing device.

FIG. 1 shows the foregoing system conceptually. In this example, FIG. 1 shows a media store 100. Media store 100 may be accessible online and is therefore pictured within the window of a Web browser 102. Media store 100 offers, for download, media content, such as music, video (e.g., movies, television), and games. The media content may be accessed, and purchased or rented, via an access-restricted account. For example, an account owner may sign-on to their account, and select media content for purchase or rent. In this context, renting media content includes downloading the media content for limited use. For example, media content may be downloaded for only one, two or any number of uses (e.g., a movie may be rented for only one viewing). Alternatively, renting may provide for unlimited use of media content, but only for a limited amount of time (e.g., a movie may be viewed any number of times within one month of download). Purchase, on the other hand, generally refers to unlimited access to the purchased media content, within the limits of the service hosting media store 100. In this context, purchase includes downloading free media content.

In the example of FIG. 1, video content, such as a movie or television show, is downloaded to a computing device, which is a smartphone 106 in this example. The video content 104 is stored in memory on smartphone 106 for use by a user of smartphone 106. For example, the user may select video content 104 for presentation on smartphone 106 or another device connected to smartphone 106, such as a desktop computer. In some instances, the video (or other media) content may include advertisements ("ads") or previews. This may be even more likely if the media content is free or reduced in price. Consequently, from the perspective of the owner licensing the video content, it is beneficial that the user use the media content sooner rather than later, particularly if the ads are time sensitive. An example of a time-sensitive ad may be a preview for an upcoming movie.

Accordingly, code associated with media store 100 is designed to periodically remind the user who downloaded the media content to view the media content. In an example, these reminders may be sent only after a period of time has elapsed following downloading the media content. For example, media store 100 determines, following the period of time, that the media content has not been used. In this case, media store 100 sends the user's computing device—in this example, smartphone 106—a reminder that the media content has not been used. The reminder may take any appropriate electronic form. For example, the reminder may be sent via electronic mail (e-mail) or text message (Short Message Service, or "SMS") or any other appropriate electronic communication. The reminder may include any appropriate, text, audio and/or video, such as a snippet of the media content that was downloaded.

In an example, snippets sent by media store 100 include excerpts of the media content that was downloaded. The snippets may be time slices of the media content that are selected to motivate the user to use the media content that was downloaded sooner rather than later. For example, what are deemed the most exciting scene(s) of a movie may be sent in an attempt to entice the user to view the movie. Such scene(s) may include a theatrical preview of the movie and/or other selected scenes that are, or are not, available to the general public.

Figure 2:
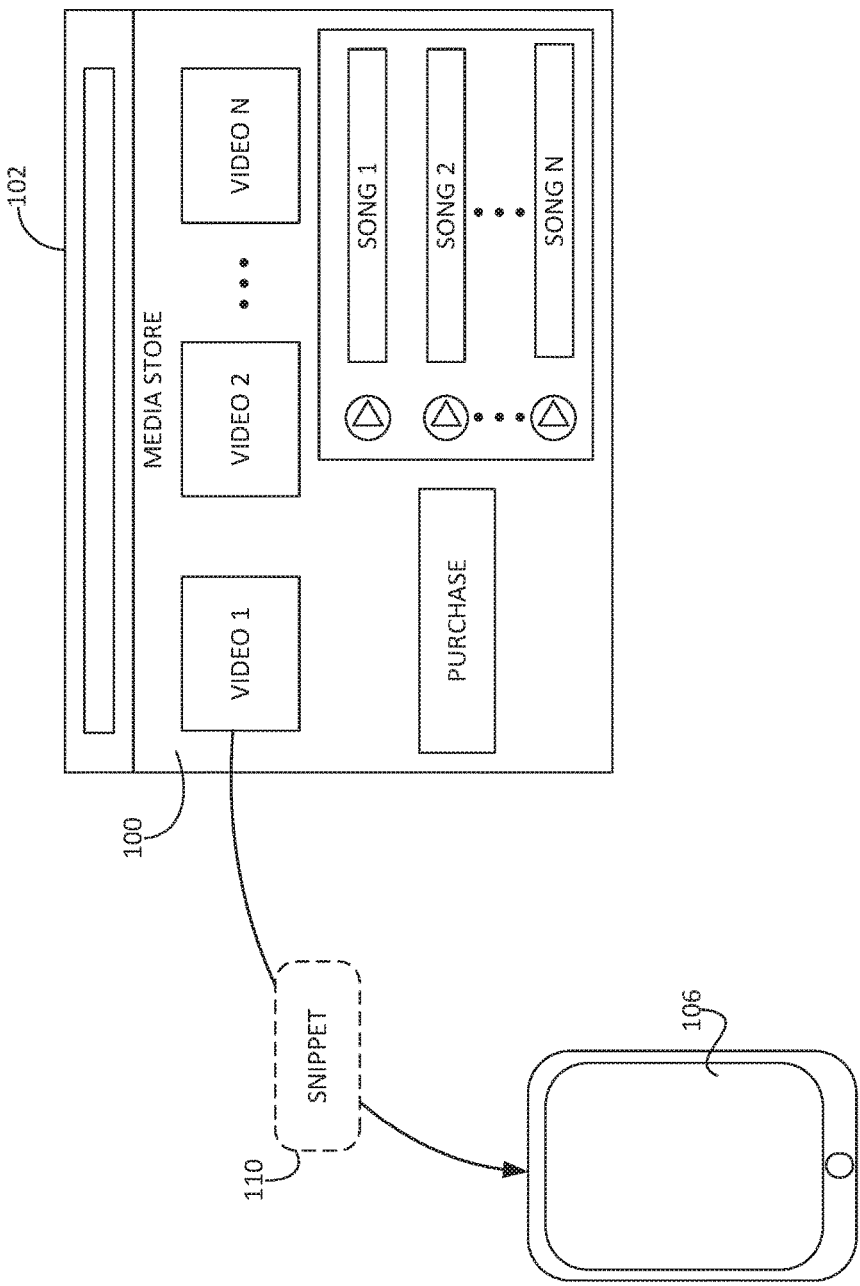

Referring to FIG. 2, after a user downloads video content 104 (FIG. 1), media store 100 waits for confirmation, e.g., from a media-store-compatible player on smartphone 106, that the video content has been used. If media store 100 determines, after an elapsed time, that video content 104 has not been used, media store 100 sends smartphone 106 a reminder to view video content 104. In this example, that reminder is a snippet 110 of the video content, which may include one or more time slices of the video content, which may, or may not, be packaged together. Snippet 110 may be sent as e-mail (or any other appropriate method of electronic communication) or it may be pushed to the media-store-compatible player on smartphone 106. The snippet 110 may, or may not, be configured to expire following an elapsed time, in which case snippet 110 may no longer be usable.

Figure 3:
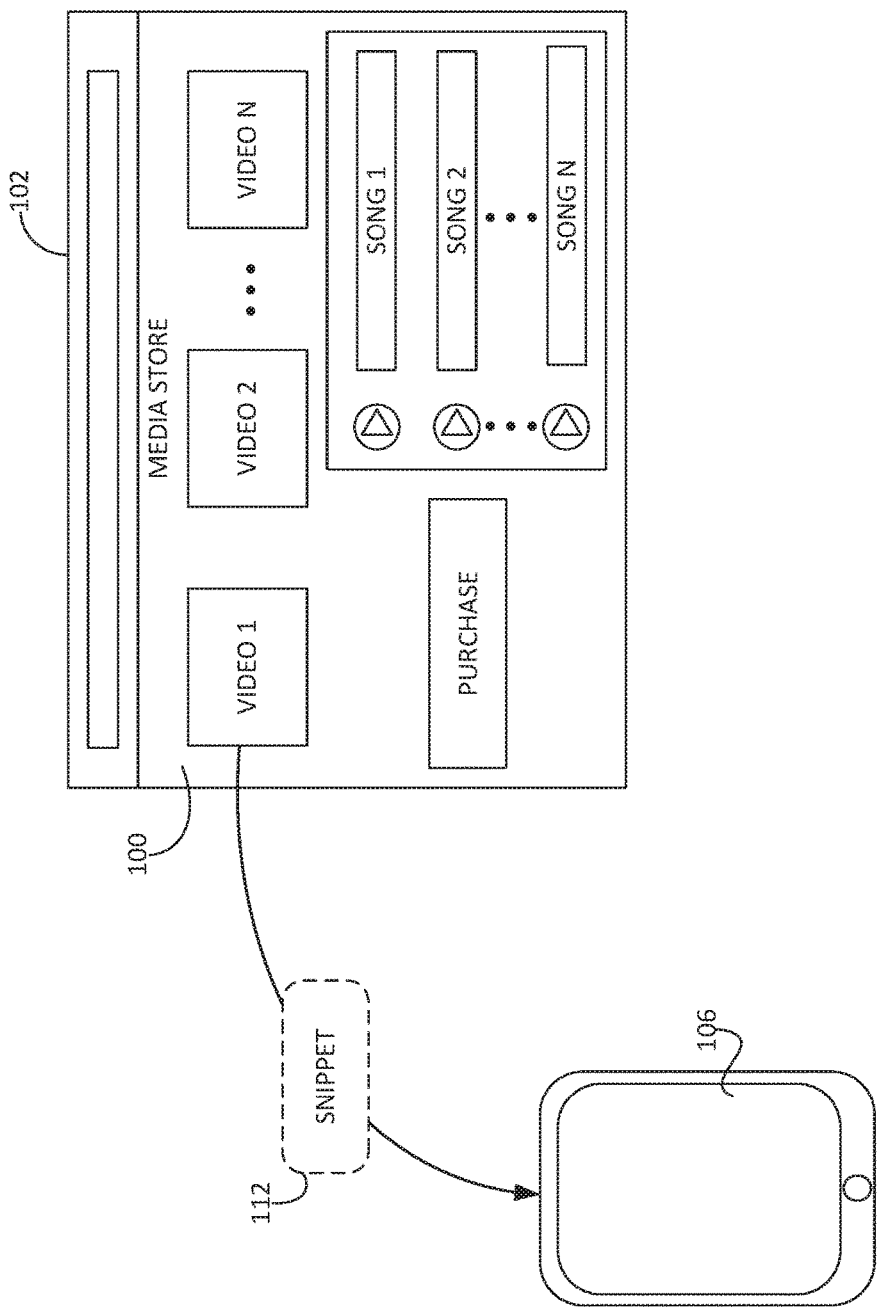

In an example, the foregoing process may be repeated, as shown in FIG. 3. More specifically, if media store 100 determines, after another elapsed time, which may be a multiple of the first elapsed time, that video content 104 has not yet been used, media store 100 sends smartphone 106 another reminder to view video content 104. This second reminder may be, or include, the original snippet 110 from FIG. 2, or it may include one or more additional snippet(s) 112. In some implementations, media store 100 may rank snippets of media content, and send them in ranked order. For example, media store 100 may send what are deemed the most interesting (and thus highest ranked) snippets first, or it may send successively more interesting snippets in subsequent reminders. The processes of FIGS. 2 and 3 may be repeated, e.g., until video content 104 is used, until a predetermined number of snippets are sent, or until a predetermined time elapses following downloading.

In addition to sending snippets of media content that has been downloaded, media store 100 may also send, to the computing device (e.g., smartphone 106), snippets that are not part of the media content that has been downloaded. For example, assume that video content 104 is an action movie. Media store 100 may send, along with a reminder snippet of the media content, snippet(s) of other action movies that it believes the user might enjoy and, therefore, might purchase. In another example, if video content 104 includes a particular actor or actress, media store may send, along with a reminder snippet of the media content, snippet(s) of other video (movies, television shows, etc.) containing that actor or actress. In another example, such snippets may be sent separately from the snippets of the media content that was previously downloaded.

The process described with respect to FIGS. 1 to 3 may be implemented on any appropriate network, with any appropriate devices and computing equipment.

Figure 4:
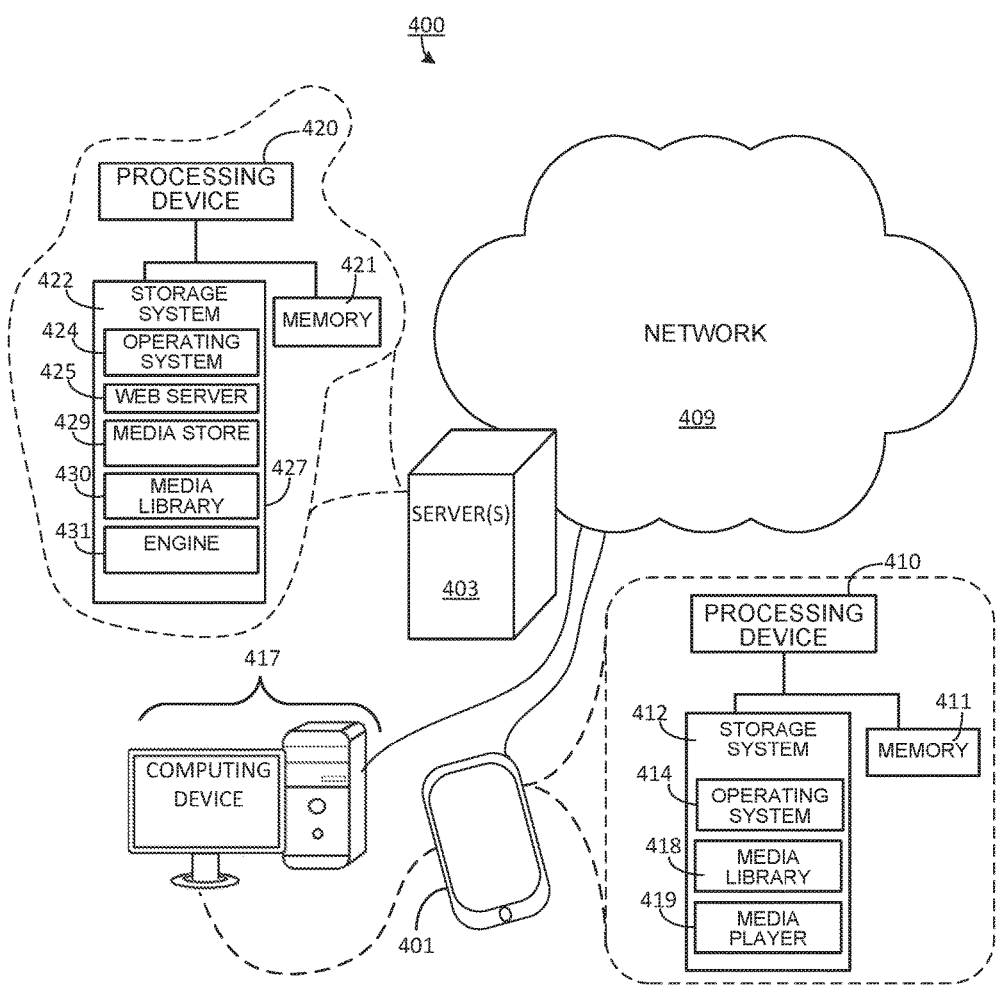
FIG. 4 is a block diagram of an example of a system on which the processes shown conceptually in FIGS. 1 to 3 may be implemented.

FIG. 4 is a block diagram of an example of a system 400 on which the process depicted conceptually in FIGS. 1 to 3 may be implemented. Mobile device 401 may be an example of the type of computing device used to perform the processes depicted in FIGS. 1 to 3. Examples of such computing devices can include a cellular telephone, personal digital assistant (PDA), a tablet computer, a desktop or laptop computer, and a smartphone. Mobile device 401 can communicate with server 403 via network 409, which may include one or more networks.

Mobile device 401 may include one or more processing devices 410, memory 411, and a storage system 412. Storage system 412 can include an operating system (OS) 414, and a media player 419 for playing media downloaded from a media store or elsewhere. Storage system 412 also stores a media library 218, which may be part of the media player, and which contains downloaded media.

Mobile device 401 may, or may not, interface to a computing device 417, which may itself contain a media player for using media downloaded via computing device 417 or via mobile device 401. Computing device 417 may include one or more processing devices, and may be, or include, a laptop computer, a handheld computer, a tablet computer, a network appliance, a camera, an enhanced general packet radio service (EGPRS) mobile phone, a media player, a navigation device, an email device, a game console, or a combination of any two or more of these data processing devices or other data processing devices. In some implementations, the computing device can be included as part of a motor vehicle (e.g., an automobile, an emergency vehicle (e.g., fire truck, ambulance), a bus).

Computing device 417 includes one or more processing devices, memory and a storage system. The storage system can store an operating system (OS), and a Web browser for accessing the Internet.

Server 403 can represent various forms of servers, such as a Web server, an application server, a proxy server, a network server, or a server farm. Server 403 can include one or more processing devices 420, memory 421 and a storage system 422. Storage system 422 can include an operating system (OS) 424 and a Web server program 425 to host a media store 429, such as that described with respect to FIG. 1. Server 403 stores a media library 430, which includes media content that is downloadable via the media store 429. Server 403 also stores an engine 431 that is configured to determine whether downloaded media content has been used and to periodically send reminders to use that media content.

Network 409 can represent a mobile communications network that can allow devices (e.g., mobile device 401) to communicate wirelessly through a communication interface (not shown), which may include digital signal processing circuitry where necessary. Network 409 can include one or more networks available for use by the devices of FIG. 4 for communication with server 403. The network(s) may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver. In addition, short-range communication may occur, such as using a Bluetooth, WiFi, or other such transceiver.

Figure 5:
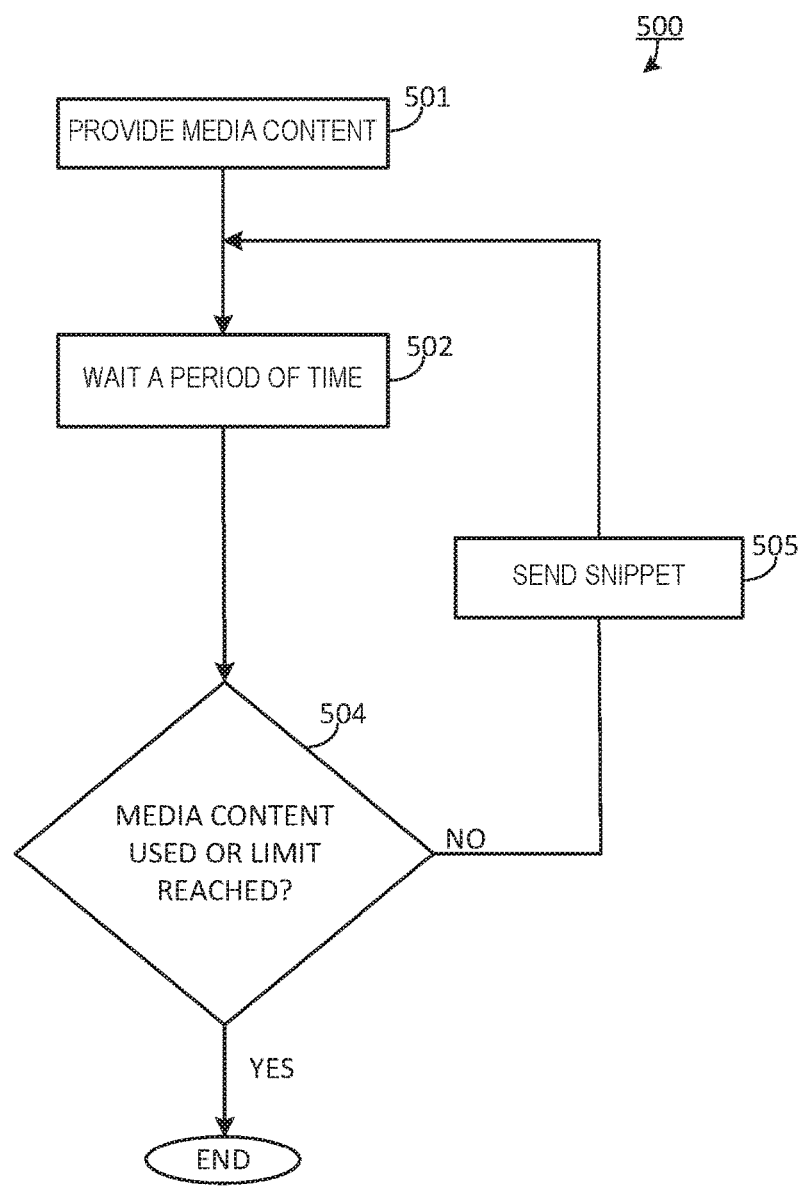
FIG. 5 is a flowchart showing an example of a process for sending snippets of media content to a computing device.

FIG. 5 is a flowchart showing a process 500, such as that described conceptually with respect to FIGS. 1 to 3, which may be performed on the system shown in FIG. 4. Process 500 may be performed by media store 429 in conjunction with engine 431, or by code associated with one or both of these entities and a media-store-compatible player residing on a computing device. According to process 500, media content is provided (501) to a user's computing device, such as mobile device 401. The media content may be provided by media store, and may include any type of audio, visual, gaming or other content.

Following download, a period of time elapses. For example, engine 431 may wait (502) a period of time after the download has occurred. Engine 431 determines (504) whether the downloaded media content has been used. For example, engine 431 may store a time at which the media content was sent to the computing device. After a period following the stored time, engine 431 may check for receipt of data indicating that the media content has been used. Such data may be sent by a media player used to play the media content, or such data may be sent by code associated with the media content. For example, playing media content may act as a trigger for such code to report to media store 429 (and thus engine 431) that the media content has been used.

If the media content has not been used within the period of time (504), a snippet of the media content is sent (505) to mobile device 401. For example, media store 429, in conjunction with engine 431, may send the snippet to mobile device 401. As noted above, snippets of media content may be ranked. For example, the snippets may be ranked from those that are the most likely to entice a user to use the media content to those are least likely to entice a user to use the media content. The first snippet sent may be either a high-ranked snippet or a low-ranked snippet. Subsequent snippets may be sent in order of ranking from highest to lowest or lowest to highest, or in any other appropriate order.

After the first snippet is sent (505), a period of time may elapse. For example, engine 431 may wait (502) for the period of time. If engine 431 determines (504) that the media content has not yet been used, a second snippet may be sent (505) to mobile device 401. The second snippet may include the first snippet or it may be a different snippet (e.g., a different time slice) of the original media content. The second snippet may be sent according to its rank, as explained above. Alternatively, random snippets may be sent.

The foregoing process may be repeated until the media content is used or until another limit is reached (504), e.g., until a predetermined number of snippets are sent, or until a predetermined time elapses following downloading. If such a limit is reached, snippets need no longer be sent. In some examples, the process continues until the media content is used. If the available snippets run-out, previous snippets may be re-sent in a ranked or random order.

In each case, a snippet that is not associated with the downloaded media content may be sent either separate from, or along with, the snippet associated with the media content. The snippets may be the same, or a different type, of media content. For example, assume that a movie is downloaded initially. Subsequent reminder snippets may include time-slices of that movie. Accompanying those reminder snippets may be snippets of the movie's theme song or snippets of other songs by the artist who performed the movie's theme song. Similarly, accompanying those reminder snippets may be snippets of movies, televisions shows, or advertisements that are unrelated to, or tangentially related to, the originally-downloaded movie. For example, assume that the movie "Transformers" was downloaded originally. Subsequent reminder snippets may include time-slices of the original movie, along with advertisements of actions figures of characters from the "Transformers" movie. Generally speaking, any appropriate commonality with the originally-downloaded media content may be used to select snippets to accompany the reminder snippets. Processes may be used, which are part of engine 431, to identify commonalities among snippets. Furthermore, such related (or unrelated) snippets need not be sent only with the reminder snippets, but rather may be sent at any appropriate time irrespective of whether a reminder snippet is being, has been, or will be sent.

The related snippets may be packaged together with the reminder snippet to form a single executable file. The related snippets may be at the beginning of, in the middle of, or at the end of, the reminder snippet in that single executable file. An option may also be provided to skip the related snippet.

In some implementations, a recipient of content from the media store or elsewhere may create and/or share a snippet of that media content with other users (e.g., friends on a social networking service). For example, a snippet can be for a favorite scene in a movie, a favorite page(s) of a book, or a favorite part of a song. The right to share may be limited by the owner of the media content. For example, the copyright owner of media content can make the entire piece of media content available for sharing, or just specific portions (e.g., snippets). For example, movie trailers, text from a book jacket, or the chorus of a song may be made available for unlimited sharing by a copyright owner.

Assuming appropriate permission has been granted if required, a user can create a unique URI (Uniform Resource Indicator) or URL (Uniform Resource Locator) that links to a snippet. The URI or URL can be sent electronically to recipients for sharing, posted to a social networking service, or otherwise made available to others on a network. Instead of a URI or URL, an actual file containing the snippet may be made available.

In some cases, depending on the content of the snippet, the user may be able to share a snippet (or other media content) free of charge. In other cases, the user may be required to pay a fee to share a snippet (or other media content). For example, the media store may provide the user with an option to purchase the right to share. For example, each predefined snippet can have an associated cost or a user can purchase the ability to create a snippet from any part, or limited part(s), of content, and pay per snippet created. The purchase for sharing may be based on how much sharing the user is permitted; e.g., there may be a tiered price system, with each tier corresponding to a defined number of "shares", up to an unlimited number of shares. In some implementations, the media is linked to the media store. The media store keeps track of the number of times a snippet is played, and prevents further playing after the purchased number of plays is reached. In other implementations, a user can be required to pay based on the length of the snippet being created and shared. For example, the user may be required to pay more for the ability to share longer snippets.

The ability to share snippets of media content among users can be an alternative way of advertising and selling the full media content. For example, in some implementations, there are no restrictions on redistributing a snippet. As a result, the snippet has the potential to go viral (e.g., passed from user to user, and so on), thereby effectively providing free advertising for the corresponding full media content. The shared snippet may include an option, such as a hyperlink, that can be accessed to purchase/rent the full media content. Any appropriate person with access to the snippet, including the sharer, the recipient, or those viewing a social feed, may have access to the option to purchase/rent the full media content.

The media store, or any other appropriate software, may keep statistics on which snippets convert best or worst; in other words, which snippets result/do not result in purchase of the full media content. Statistics may also be kept on which social networking services, sharers, or other communities that pass along the snippets are best/worst at driving sales via the snippets.

The full media content may be purchased all at once, or piecemeal. For example, in response to an initial snippet of media content (either free or purchased for a price), a user may download subsequent snippets of media content at will. The user may be charged piece-by-piece for each subsequent snippet of media content. For example, the user may receive a first chapter of a book for free, and then be charged for subsequent chapters as each of those subsequent chapters is downloaded to the user, e.g., from the media store.

Users of a social networking Web site, when viewing their e-mail or other type of electronic communication (e.g., content stream, blog post, text message, tweet, etc.), may access a snippet of media content by selecting the provided URL. In some cases, the user can combine the sending of the URL identifying a snippet of media content to another party with a gift of the entire media content to the other party. For example, an electronic communication containing the snippet may contain a link to the full media content along with a key, password, or other way of accessing the full content after selecting the link.

The snippet can include media content for a limited duration of time starting at a given time within a media selection. For example, the snippet can start at a first time within a selection and end at a second time within the media content. The amount of time or total media content included in the snippet may be limited. For example, a snippet may have a maximum size or a minimum size. Likewise a number of snippets that may be extracted from media content may be limited. For example, only five snippets may be extracted from a movie, a book, or the like. The media store or any other distributor may dictate such limits.

In any case, a unique URI or URL can be formatted to identify the snippet. For example, the URL can identify the media content, the location of the start of the snippet and duration of the snippet (e.g., <title> <track> <playtime>).

Figure 6:
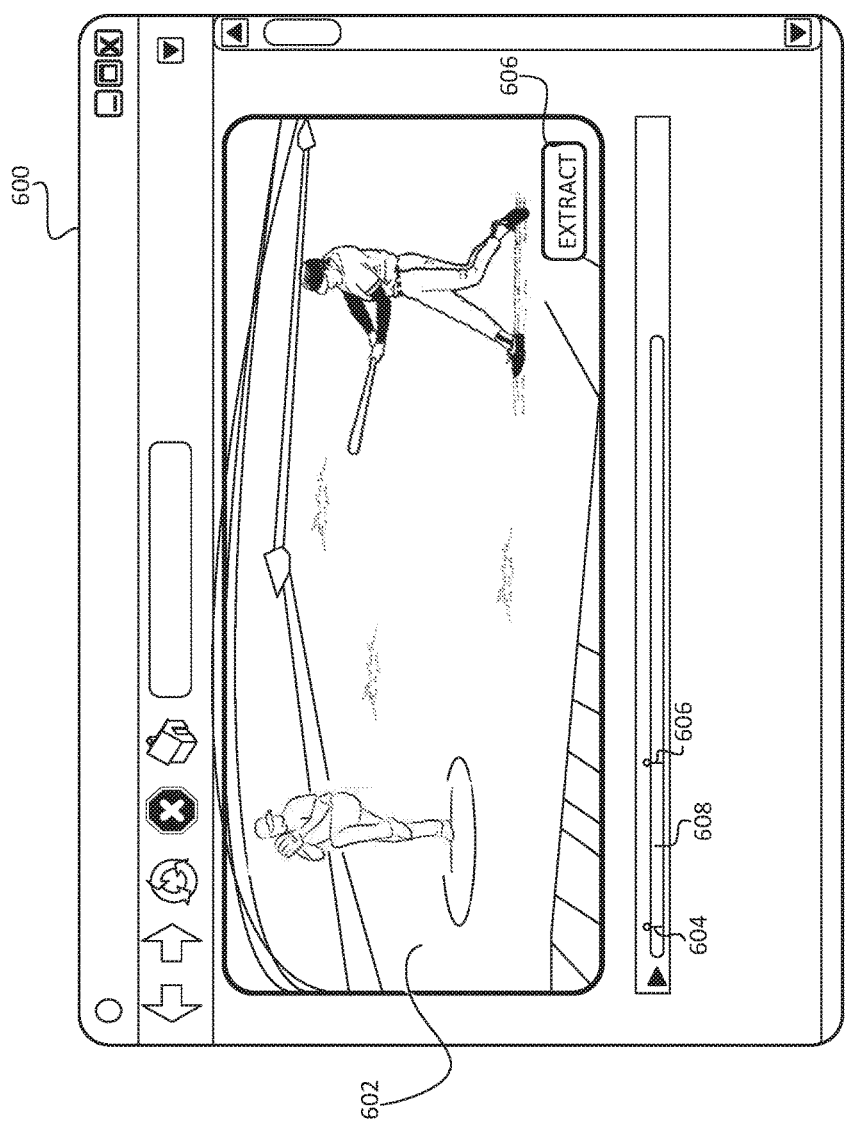
FIG. 6 shows a browser displaying video from which a snippet is extracted.

FIG. 6 shows an example of a Web browser 600 displaying video 602 offered by media store 100. The functionality for creating a snippet may be provided by the media store, by appropriate software on the user's computer, or by remote software accessed over a network (e.g., in the network cloud). A user may select portions of video by positioning markers 604, 606 along a timeline 608 for the video. Clicking on extract button 606 (or other appropriate control) creates a snippet, such as a URL, which links to the video on the user's computer, to the video in the media store, or to any other appropriate location containing the video. The URL can be copied and pasted into any appropriate electronic communication. Similar methods may be used to extract content for snippets from other forms of media.

In some implementations, advertisements, or additional pieces of media content other than advertisements, may also be incorporated into the snippet. For example, snippets provided by the media store may include advertisements embedded in, or overlaid onto, the media in the snippet. Likewise, a user may incorporate advertisements or other appropriate content into a snippet. In other examples, multiple pieces of media content (e.g., two snippets from different or the same video) may be incorporated into the same snippet. In some implementations, the addition of media content to a snippet may be based on the popularity of that added media content. For example, if the system knows the relative popularity of clips of video from a movie (as evidenced, e.g., by a number of downloads of those clips), then the most popular clip may be incorporated into the snippet. Subsequent clips may be incorporated into subsequent snippets based on popularity.

Snippets obtained in the manner described in FIG. 5 or from any other appropriate source may be shared via a social networking service in any appropriate manner described herein. Likewise, snippets created from content purchased from media store 100 or from any other appropriate content may be shared via a social networking service in the manner described above.

The systems described herein typically include mechanisms to ensure that copyrights are respected. For example, media content not authorized by the copyright owner for sharing may include code that restricts or prevents copying of all or part of the media content. Furthermore, the processes described herein for sharing snippets may require checking whether content is protected by copyright before proceeding with creating and/or sharing a snippet.

Figure 7:
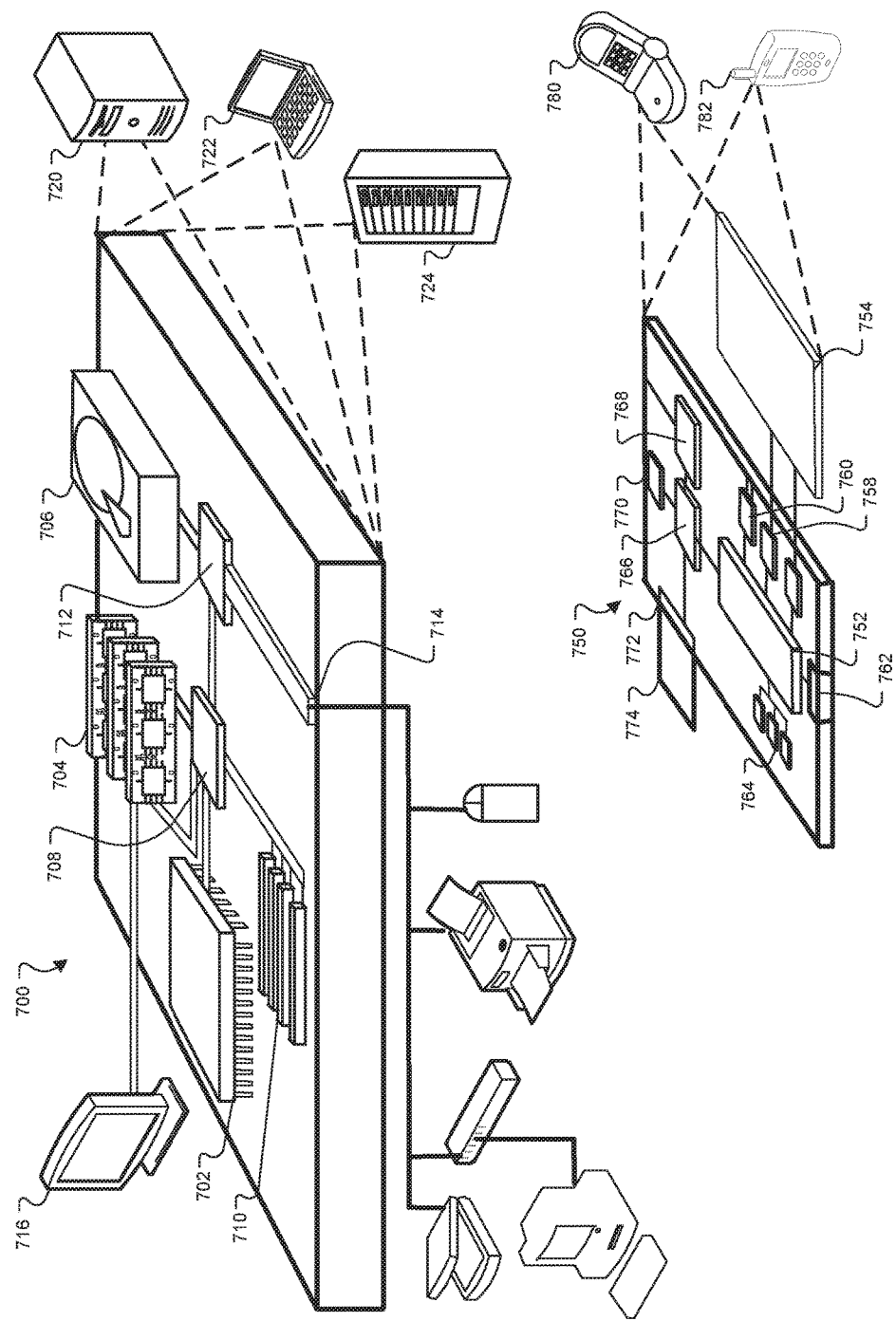
FIG. 7 is an example of a computing device on which the processes described herein may be implemented.

FIG. 7 shows an example of a generic computer device 700 and a generic mobile computer device 750, which may be used to implement the processes described herein. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be examples only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable medium, such as the memory 704, the storage device 706, memory on processor 702, or a propagated signal. For example, the information carrier may be a non-transitory, machine-readable storage medium.

The high speed controller 708 manages bandwidth-intensive operations for the computing device 700, while the low speed controller 712 manages lower bandwidth-intensive operations. Such allocation of functions is an example only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, Wi-Fi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

Content generated according to the processes described herein may be displayed on a computer peripheral (e.g., a monitor) associated with a computer, a mobile device display, and so forth. The display physically transforms the computer peripheral. For example, if the computer peripheral is an LCD display, the orientations of liquid crystals are changed by the application of biasing voltages in a physical transformation that is visually apparent to the user. As another example, if the computer peripheral is a cathode ray tube (CRT), the state of a fluorescent screen is changed by the impact of electrons in a physical transformation that is also visually apparent. Moreover, the display of content on a computer peripheral is tied to a particular machine, namely, the computer peripheral.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether and/or how to receive content from the content server that may be more relevant to the user. In addition, certain data may be anonymized in one or more ways before it is stored or used, so that personally identifiable information is removed when generating monetizable parameters (e.g., monetizable demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Elements of different implementations described herein may be combined to form other implementations not specifically set forth above. Elements may be left out of the processes, computer programs, Web pages, etc. described herein without adversely affecting their operation. Furthermore, various separate elements may be combined into one or more individual elements to perform the functions described herein.

Other implementations not specifically described herein are also within the scope of the following claims.

What is claimed is:

1. A computer-implemented method, comprising:
    receiving, by a computing system that operates a social networking service, a request to share, on the social networking service, a media content item that was selected by a first member of the social networking service;
    identifying, by the computing system and in response to receiving the request, a snippet of the media content item to share on the social networking service, the snippet being a portion of an entirety of the media content item;
    identifying, by the computing system, one or more second members of the social networking service to whom the first member is connected on the social networking service;
    causing the snippet of the media content item to be shared with the one or more second members of the social networking service by providing the snippet for presentation in respective content streams for the one or more second members of the social networking service;
    determining a total number of times that the snippet of the media content item has been played on the social networking service;
    determining whether a condition that is based on the total number of times that the snippet of the media content item has been played on the social networking service meets a criterion that is to limit occurrences of the snippet of the media content item being played on the social networking service; and
    in response to determining that the condition that is based on the total number of times that the snippet of the media content item has been played on the social networking service meets the criterion that is to limit occurrences of the snippet of the media content item being played on the social networking service, blocking further playback of the snippet of the media content item on the social networking service.

2. The computer-implemented method of claim 1, wherein causing the snippet of the media content item to be shared with the one or more second members of the social networking service comprises providing, along with the snippet of the media content item in the respective content streams for the one or more second members, an option for the one or more second members to purchase or rent the entirety of the media content item.

3. The computer-implemented method of claim 2, wherein providing the option to purchase or rent the entirety of the media content item comprises providing, along with the snippet of the media content item in the respective content streams for the one or more second members, a hyperlink that points to a location at which the entirety of the media content item is available to be purchased or rented.

4. The computer-implemented method of claim 1, wherein identifying the snippet of the media content item to share on the social networking service comprises:
    (i) accessing a universal resource locator (URL) for the media content item or a universal resource indicator (URI) for the media content item, and
    (ii) determining the portion of the media content item for the snippet based on information contained in the URL for the media content item or the URI for the media content item that specifies a location of the portion of the media content item from within the entirety of the media content item.

5. The computer-implemented method of claim 1, wherein:
    the media content item is a first media content item,
    the snippet further includes at least a portion of a second media content item in addition to the portion of the entirety of the first media content item, and
    the second media content item is distinct from the first media content item.

6. The computer-implemented method of claim 1, wherein the snippet of the media content item is identified by a universal resource locator (URL) or a universal resource indicator (URI) that includes data representing an address of the media content item, a starting location of the snippet in the media content item, and a duration of the snippet.

7. The computer-implemented method of claim 6, wherein the duration of the snippet is represented in the URL or the URI by data that specifies a playtime of the snippet.

8. The computer-implemented method of claim 6, wherein the duration of the snippet is represented in the URL or the URI at least in part by data that specifies an ending location of the snippet in the media content item.

9. The computer-implemented method of claim 1, wherein a distributor of the media content item imposes a limit on a number of snippets that are permitted to be extracted from the media content item.

10. The computer-implemented method of claim 1, wherein a size of the snippet of the media content item complies with at least one of a maximum snippet size restriction or a minimum snippet size restriction imposed by a distributor of the media content item.

11. The computer-implemented method of claim 1, wherein:
the first member of the social networking service obtained the media content item from an online media store that makes available to the public the media content item and other media content; and
identifying the snippet of the media content item to share on the social networking service comprises verifying that the first member of the social networking service is authorized to share the snippet of the media content item as a result of having obtained the media content item from the online media store.

12. The computer-implemented method of claim 11, wherein verifying that the first member of the social networking service is authorized to share the snippet of the media content item comprises determining that the first member of the social networking service has purchased a right to share the snippet of the media content item.

13. The computer-implemented method of claim 12, wherein a price that the first member of the social networking service paid to purchase the right to share the snippet of the media content item is based on a number of times that the first member of the social networking service is authorized to share the snippet of the media content item.

14. The computer-implemented method of claim 12, wherein a price that the first member of the social networking service paid to purchase the right to share the snippet of the media content item is based on a length of the snippet of the media content item.

15. One or more non-transitory machine-readable devices storing instructions that, when executed by one or more processors of a computing system that operates a social networking service, cause performance of operations comprising:
receiving, by the computing system, a request to share, on the social networking service, a media content item that was selected by a first member of the social networking service;
identifying, by the computing system and in response to receiving the request, a snippet of the media content item to share on the social networking service, the snippet being a portion of an entirety of the media content item;
identifying, by the computing system, one or more second members of the social networking service to whom the first member is connected on the social networking service;
causing the snippet of the media content item to be shared with the one or more second members of the social networking service by providing the snippet for presentation in respective content streams for the one or more second members of the social networking service;
determining a total number of times that the snippet of the media content item has been played on the social networking service;
determining whether a condition that is based on the total number of times that the snippet of the media content item has been played on the social networking service meets a criterion that is to limit occurrences of the snippet of the media content item being played on the social networking service; and
in response to determining that the condition that is based on the total number of times that the snippet of the media content item has been played on the social networking service meets the criterion that is to limit occurrences of the snippet of the media content item being played on the social networking service, blocking further playback of the snippet of the media content item on the social networking service.

16. The one or more non-transitory machine-readable devices of claim 15, wherein causing the snippet of the media content item to be shared with the one or more second members of the social networking service comprises providing, along with the snippet of the media content item in the respective content streams for the one or more second members, an option for the one or more second members to purchase or rent the entirety of the media content item.

17. The one or more non-transitory machine-readable devices of claim 16, wherein providing the option to purchase or rent the entirety of the media content item comprises providing, along with the snippet of the media content item in the respective content streams for the one or more second members, a hyperlink that points to a location at which the entirety of the media content item is available to be purchased or rented.

18. The one or more non-transitory machine-readable devices of claim 15, wherein identifying the snippet of the media content item to share on the social networking service comprises:
(i) accessing a universal resource locator (URL) for the media content item or a universal resource indicator (URI) for the media content item, and
(ii) determining the portion of the media content item for the snippet based on information contained in the URL for the media content item or the URI for the media content item that specifies a location of the portion of the media content item from within the entirety of the media content item.

19. A computing system, comprising:
one or more processors; and
one or more non-transitory computer-readable media having instructions stored thereon that, when executed by the one or more processors, cause the one or more processors to perform operations comprising:
receiving a request to share, on a social networking service, a media content item that was selected by a first member of the social networking service;
identifying, in response to receiving the request, a snippet of the media content item to share on the social networking service, the snippet being a portion of an entirety of the media content item;
identifying one or more second members of the social networking service to whom the first member is connected on the social networking service;
causing the snippet of the media content item to be shared with the one or more second members of the social networking service by providing the snippet for presentation in respective content streams for the one or more second members of the social networking service;

determining a total number of times that the snippet of the media content item has been played on the social networking service;

determining whether a condition that is based on the total number of times that the snippet of the media content item has been played on the social networking service meets a criterion that is to limit occurrences of the snippet of the media content item being played on the social networking service; and in response to determining that the condition that is based on the total number of times that the snippet of the media content item has been played on the social networking service meets the criterion that is to limit occurrences of the snippet of the media content item being played on the social networking service, blocking further playback of the snippet of the media content item on the social networking service.

\* \* \* \* \*